United States Patent
Li

(10) Patent No.: US 9,588,927 B2
(45) Date of Patent: Mar. 7, 2017

(54) INTERFACE SWITCHING CONTROL METHODS, AND PORTABLE TERMINALS AND PORTABLE MOBILE DEVICES USING THE SAME

(75) Inventor: Guangbin Li, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 216 days.

(21) Appl. No.: 13/993,261

(22) PCT Filed: Nov. 29, 2011

(86) PCT No.: PCT/CN2011/083137
§ 371 (c)(1),
(2), (4) Date: Jun. 11, 2013

(87) PCT Pub. No.: WO2012/079457
PCT Pub. Date: Jun. 21, 2012

(65) Prior Publication Data
US 2013/0282947 A1    Oct. 24, 2013

(30) Foreign Application Priority Data
Dec. 13, 2010    (CN) .......................... 2010 1 0586883

(51) Int. Cl.
*G06F 13/40*    (2006.01)
*G06F 13/38*    (2006.01)
*G06F 1/16*    (2006.01)

(52) U.S. Cl.
CPC ........ *G06F 13/4027* (2013.01); *G06F 13/385* (2013.01); *G06F 1/1626* (2013.01); *Y02B 60/1228* (2013.01); *Y02B 60/1235* (2013.01)

(58) Field of Classification Search
CPC .................................................. G06F 13/4027
See application file for complete search history.

(56) References Cited

U.S. PATENT DOCUMENTS 5,349,689 A * 9/1994 Suzuki .......................... 710/301
6,470,284 B1 * 10/2002 Oh et al. ......................... 702/64
(Continued)

FOREIGN PATENT DOCUMENTS

CN    1117318 A    2/1996
CN    2672715 Y    1/2005
(Continued)

OTHER PUBLICATIONS

"International Application Serial No. PCT/CN2011/083137, International Search Report mailed Mar. 1, 2012", 9 pgs.
(Continued)

*Primary Examiner* — Brian Misiura
(74) *Attorney, Agent, or Firm* — Schwegman Lundberg & Woessner, P.A.

(57) ABSTRACT

An interface switching control method, a portable terminal and a portable mobile device using the method are disclosed. The method is applied in a portable terminal including a first device and a second device. The first device is connected to a shared device via a first interface, and the second device is connected to the shared device via a second interface. The portable terminal has a first state in which the first device and the second device are connected, and a second state in which the first device and the second device are disconnected. The method includes detecting a state of the portable terminal; and when the detection result indicates that the portable terminal is in the first state, controlling the first interface to be in an enabled state and controlling the second interface to be in a disabled state. The method achieves a real-time switching control over the interfaces for the shard device, and optimizes the interface control for the hybrid-system portable terminal. It is possible to meet various system performance requirements of different devices and reduce the system power consumption by enabling the (Continued)

interfaces required by the respective devices according to the different state of the portable terminal.

15 Claims, 4 Drawing Sheets

(56) References Cited

U.S. PATENT DOCUMENTS

| | | | |
|---|---|---|---|
| 7,197,584 B2 * | 3/2007 | Huber et al. | 710/72 |
| 7,526,586 B2 * | 4/2009 | Huber et al. | 710/72 |
| 7,890,678 B2 * | 2/2011 | Choi | G06F 1/1616 |
| | | | 710/14 |
| 8,117,370 B2 * | 2/2012 | Rofougaran et al. | 710/303 |
| 8,566,489 B2 * | 10/2013 | Davis et al. | 710/62 |
| 8,682,962 B2 * | 3/2014 | Roper et al. | 709/203 |
| 8,793,405 B2 * | 7/2014 | Chen | G06F 1/1616 |
| | | | 710/15 |
| 8,909,838 B2 * | 12/2014 | Hsu et al. | 710/303 |
| 9,128,891 B2 * | 9/2015 | Zhang | G06F 1/3293 |
| 9,244,728 B2 * | 1/2016 | Shao | G06F 9/48 |
| 2002/0103951 A1 * | 8/2002 | Huber et al. | 710/72 |
| 2003/0112585 A1 * | 6/2003 | Silvester | 361/679 |
| 2005/0185364 A1 * | 8/2005 | Bell et al. | 361/679 |
| 2007/0213105 A1 * | 9/2007 | Huber et al. | 455/899 |
| 2009/0196280 A1 * | 8/2009 | Rofougaran | 370/351 |
| 2009/0197641 A1 * | 8/2009 | Rofougaran et al. | 455/556.1 |
| 2009/0198989 A1 * | 8/2009 | Rofougaran et al. | 713/2 |
| 2009/0327767 A1 | 12/2009 | Ginzburg et al. | |
| 2010/0037072 A1 * | 2/2010 | Nejah | 713/310 |
| 2011/0320405 A1 * | 12/2011 | Hsu et al. | 707/634 |
| 2012/0162058 A1 * | 6/2012 | Davis et al. | 345/156 |
| 2012/0166521 A1 * | 6/2012 | Roper et al. | 709/203 |
| 2012/0166676 A1 * | 6/2012 | Roper et al. | 709/250 |
| 2012/0166679 A1 * | 6/2012 | Zawacki et al. | 710/8 |
| 2012/0166851 A1 * | 6/2012 | Davis et al. | 713/324 |
| 2012/0176746 A1 * | 7/2012 | Chen et al. | 361/679.55 |
| 2013/0024590 A1 * | 1/2013 | Zhao | 710/300 |

FOREIGN PATENT DOCUMENTS

| | | | |
|---|---|---|---|
| CN | 101359316 A | | 2/2009 |
| CN | 101403936 A | | 4/2009 |
| CN | 101616506 A | | 12/2009 |
| CN | 201628880 U | | 11/2010 |
| CN | 201628885 U | | 11/2010 |
| GB | 2283596 A | | 5/1995 |
| GB | 2470625 A | * 12/2010 | G06F 1/16 |

OTHER PUBLICATIONS

"Chinese Application No. 201010586883.0, Office Action mailed Feb. 28, 2014", w/ English Translation, (Feb. 28, 2014), 18 pgs.

"Chinese Application No. 201010586883.0, Office Action mailed Feb. 28, 2015", w/ English Translation, (Feb. 28, 2015), 11 pgs.

"Chinese Application No. 201010586883.0, Office Action mailed Sep. 30, 2014", w/ English Translation, (Sep. 30, 2014), 10 pgs.

* cited by examiner

INTERFACE SWITCHING CONTROL METHODS, AND PORTABLE TERMINALS AND PORTABLE MOBILE DEVICES USING THE SAME

This application is a U.S. National Stage Application filed under 35 U.S.C §371 of International Application Ser. No. PCT/CN2011/083137, filed on Nov. 29, 2011 and published as WO 2012/079457 A1 on Jun. 21, 2012 which application claims priority to Chinese Application No. 201010586883.0, filed on Dec. 13, 2010, both of which applications and publication are incorporated herein by reference in their entireties.

TECHNICAL FIELD

The present application relates to communications technology, and more particularly, to interface switching control methods, portable terminals, portable mobile devices and input devices.

BACKGROUND

A portable terminal of hybrid system architecture may refer to a PC (Personal Computer) constructed by embedding at least one additional system on a conventional PC having a single system. The different systems may cooperate and bring their own advantages into play. The conventional portable terminal of hybrid system architecture usually integrates a master system (e.g., X86 system) and a slave system (e.g., ARM system). The master and slave systems can share devices, such as keyboard, network card, display, storage device, Audio and the like. Taking a notebook as example, the slave system is generally integrated in a slave device where the display is disposed, while the master system is integrated in a master device where the keyboard is disposed. The master and slave systems can operate in combination or independently from each other, in which case the display is used by the slave device. The display can be used by either of the master or slave device when they operate in combination.

It has been found in the study of the conventional hybrid-architecture portable terminal that when sharing devices, the conventional master and slave devices require a uniform interface bus configuration, i.e., both of the devices use the same interface bus to mount the shared devices. Accordingly, in order to be compatible with all interfaces of one of the master and slave devices, the interfaces of the other device have to be extended to keep consistency therebetween. However, for a hybrid-system portable terminal, the performance requirements of the master and slave devices are different. The ARM system requires that the interface has a quick response and low power consumption, while the X86 system requires that the interface bus is universal, thereby reducing the number of drives to be installed. Use of a uniform interface will degrade the system performance of the portable terminal, and cannot meet the requirements of the respective systems.

SUMMARY

Embodiments of the present application is to provide an interface switching control method, a portable terminal, a portable mobile device and an input device, in order to solve the problem that uniform interface configuration between the master and slave devices will cause degradation of system performance and cannot meet the requirements of the respective systems.

Embodiments of the present application provide the following solutions to the above problem.

An interface switching control method applied in a portable terminal including a first device and a second device, wherein the first device is connected to a shared device via a first interface, and the second device is connected to the shared device via a second interface, the portable terminal has a first state in which the first device and the second device are connected, and a second state in which the first device and the second device are disconnected, the method comprises:

detecting a state of the portable terminal, and generating a detection result;

when the detection result indicates that the portable terminal is in the first state, controlling the first interface to be in an enabled state and controlling the second interface to be in an disabled state so that the first device responds to information inputted from the shared device.

The method further comprises when the detection result indicates that the portable terminal is in the second state, controlling the second interface to be in an enabled state so that the second device responds to information inputted from the shared device.

The method further comprises controlling the first interface to be in a disabled state while controlling the second interface to be in an enabled state.

The first interface is different from the second interface. Detecting a state of the portable terminal comprises:

receiving a level signal transmitted from an interface connector;

determining the portable terminal to be in the first state when the level signal is a high level signal, and determining the portable terminal to be in the second state when the level signal is a low level signal.

A portable terminal comprising a first device, a second device and a shared device, wherein the first device is connected to a shared device via a first interface, and the second device is connected to the shared device via a second interface, the portable terminal has a first state in which the first device and the second device are connected, and a second state in which the first device and the second device are disconnected, the second device further comprises:

a detection unit configured to detect a state of the portable terminal and generate a detection result;

a control unit configured to, when the detection result indicates that the portable terminal is in the first state, control the first interface to be in an enabled state and control the second interface to be in an disabled state so that the first device responds to information inputted from the shared device.

The control unit is further configured to, when the detection result indicates that the portable terminal is in the second state, control the second interface to be in an enabled state so that the second device responds to information inputted from the shared device.

The control unit is further configured to control the first interface to be in a disabled state while controlling the second interface to be in an enabled state.

The detection unit further comprises:

a level signal reception unit configured to receive a level signal transmitted from an interface connector;

a terminal state determination unit configured to determine the portable terminal to be in the first state when the level signal is a high level signal, and determine the portable terminal to be in the second state when the level signal is a low level signal.

A portable mobile device comprising a shared device and a connection port, the shared device having a first interface and a second interface, wherein the connection port is configured to connect with an electronic device, and the first interface is connected to the electronic device via the connection port when the portable mobile deice is connected with the electronic device, the portable mobile device comprises:

a detection unit configured to detect a state of the portable mobile device and generate a detection result;

a control unit configured to, when the detection result indicates that the portable mobile device is connected with the electronic device, control the first interface to be in an enabled state and control the second interface to be in an disabled state so that the electronic device responds to information inputted from the shared device.

The control unit is further configured to, when the detection result indicates that the portable mobile device is disconnected from the electronic device, control the second interface to be in an enabled state so that the portable mobile device responds to information inputted from the shared device.

The control unit is further configured to control the first interface to be in a disabled state while controlling the second interface to be in an enabled state.

An input device comprising:

a first interface configured to connect with a first electronic device;

a second interface configured to connect with a second electronic device;

an input unit provided for an operation by an operator;

an obtaining unit connected to the input unit and configured to obtain input information when the operator operates the input unit;

a control unit connected to each of the obtaining unit, the first interface and the second interface, and configured to transmit the input information obtained by the obtaining unit to the first and second interfaces, and control according to a predetermined policy one of the first and second interfaces to be in an enabled state and the other one to be in a disabled state.

The control unit comprises:

a command reception unit configured to receive an key enable command;

an enable control unit configured to, based on instruction of the key enable command, control one of the first and second interfaces to be in an enabled state and the other one to be in a disabled state.

The control unit comprises:

a message reception unit configured to receive a connection state message transmitted from any one of the first and second electronic devices when the first and second electronic devices are connected or disconnected;

an enable control unit configured to control the first interface to be in an enabled state and the second interface to be in a disabled state when the connection state message indicates that the first and second electronic devices are connected, and to control the first interface to be in a disabled state and the second interface to be in an enabled state when the connection state message indicates that the first and second electronic devices are disconnected.

The control unit comprises:

a connection detection unit configured to detect a connection state between the first and second electronic devices, and to generate a detection result;

an state enable unit configured to control the first interface to be in an enabled state and the second interface to be in a disabled state when the detection result indicates that the first and second electronic devices are connected, and to control the first interface to be in a disabled state and the second interface to be in an enabled state when the detection result indicates that the first and second electronic devices are disconnected.

In the above solutions according to embodiments of the present application, the portable terminal includes a first device and a second device. The first device is connected to a shared device via a first interface, and the second device is connected to the shared device via a second interface. The portable terminal has a first state in which the first device and the second device are connected, and a second state in which the first device and the second device are disconnected. The state of the portable terminal is detected to generate a detection result. When the detection result indicates that the portable terminal is in the first state, the first interface is controlled to be in an enabled state and the second interface is controlled to be in a disabled state, so that the first device responds to information inputted from the shared device. For a conventional hybrid-system portable terminal having X86 system and ARM system, the performance requirements of the master and slave devices are different. The ARM system requires that the interface has a quick response and low power consumption, while the X86 system requires that the interface bus is universal, thereby reducing the number of drives to be installed. Use of a uniform interface will degrade the system performance of the portable terminal, and cannot meet the requirements of the respective systems. For example, if a USB is used as a common interface to a shared device (e.g., a touch screen), it is possible to meet the requirement of the X86 system to reduce the number of drives to be installed. However, when the USB is used by the ARM system, the power consumption is increased, and the system response is slowed down because the USB drive has to be reinstalled upon wakeup from a sleep mode. Unlike the conventional method, the embodiments of the present application provide at least two interfaces for a shared device, and implement a real-time switching control over the interfaces for the shard device. This can optimize the interface control for the hybrid-system portable terminal. Further, the embodiments of the present application can meet system performance requirements of different devices and reduce the system power consumption by enabling the interfaces required by the respective devices according to the different states of the portable terminal.

DETAILED DESCRIPTION OF THE EMBODIMENTS

Figure 1:
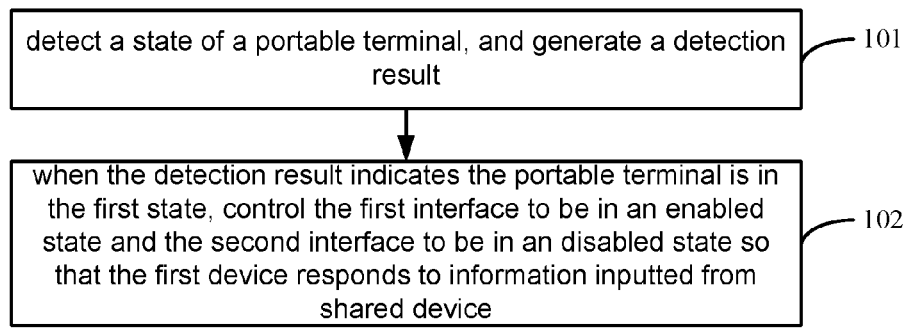
FIG. 1 is a flow chart of a first embodiment of an interface switching method of the present application.

Some of the following embodiments of the present application provide interface switching control methods, and some provide portable terminals, portable mobile devices and input devices.

In the following, embodiments of the present application will be further explained with reference to the figures, to facilitate a better understanding of the present invention by those skilled in the art and make the above object, features and advantages of the embodiments more apparent.

An interface switching control method in an embodiment may be applied in a portable terminal including a first device and a second device. The first device is connected to a shared device via a first interface, and the second device is connected to the shared device via a second interface. The portable terminal has a first state in which the first device and the second device are connected, and a second state in which the first device and the second device are disconnected. The shared device may be an input device. Further, the input device may be a touch input device, such as a touch screen. The shared device may be integrated with the first or second device.

For example, the first device of the portable terminal may particularly be a master device on which the X86 system is running, and the second device may particularly be a slave device on which the ARM system is running. The first interface may be a USB interface, and the second interface may be a UART interface. Suppose that the shared input device is a touch screen integrated with the slave device. When the master and slave devices are in the first state, i.e., operate with a hybrid system by combining the X86 and ARM systems, only the USB interface may be enabled so that the X86 system on the master device will respond to input information from the touch screen. When the master and slave devices are in the second state, i.e., using the X86 and ARM systems separately, only the UART interface may be enabled so that the ARM system on the slave device will respond to input information from the touch screen. By enabling different interfaces as the portable terminal is in different connection states, it is possible to meet the requirements of different systems and reduce the system power consumption.

The first interface conforms to the system requirement/specification of the first device. The second interface conforms to the system requirement/specification of the second device. Further, the first interface is different from the second interface. For example, the first device running the X86 system has the USB interface as its general interface, and the system contains its own drive. Therefore, when the touch screen is connected to the system via the USB, no additional installation of a drive is required. The second device running the ARM system has the UART as the interface for the ARM system. The UART has a lower power consumption than that of the USB, and requires no additional installation of a drive. In this case, the touch screen responds fasters than in the case of the USB.

FIG. 1 is a flow chart of a first embodiment of an interface switching method of the present application. The first device is the master device, and the second device is the slave device.

Step 101: detect a state of the portable terminal, and generate a detection result.

In an example where the shared device is integrated with the slave device, the slave and master devices each have a connection port through which the slave and master devices can be physically connected or disconnected. In the present embodiment, the slave device detects whether the portable terminal is in the first state of the master and the slave devices being connected or in the second state of the master and the slave devices being disconnected, according to the connection condition of the connection ports.

Here, the shared device may be connected to each of the first and second interfaces provided on the slave device via a control unit within the slave device, or the first and second interfaces may be provided on the shared device. The master device may be connected to the shared device via the first interface, and the slave device may be connected to the shared device via the second interface.

Step 102: when the detection result indicates that the portable terminal is in the first state, control the first interface to be in an enabled state and control the second interface to be in a disabled state so that the first device responds to information inputted from the shared device.

In the present embodiment, when the detection result indicates that the portable terminal is in the first state of the master and the slave devices being connected, the control unit in the slave device may control to enable the first interface and disable the second interface. Now the master device may respond, via the first interface, to the information inputted from the shared device.

Figure 2:
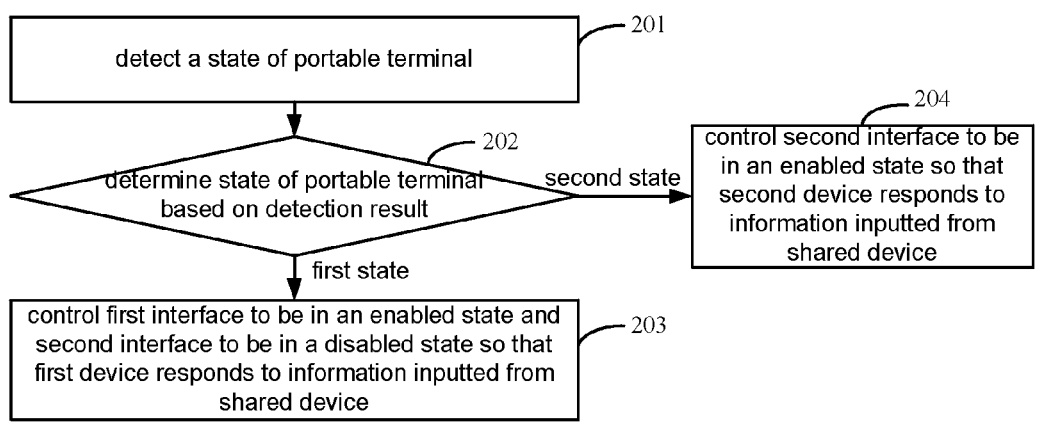
FIG. 2 is a flow chart of a second embodiment of an interface switching method of the present application.

FIG. 2 is a flow chart of a second embodiment of an interface switching method of the present application. The first device is the master device, and the second device is the slave device.

Step 201: detect a state of the portable terminal.

Still in the example where the shared device is integrated with the slave device, the slave and master devices each have a connection port through which the slave and master devices can be physically connected or disconnected. In the present embodiment, the slave device detects whether the portable terminal is in the first state of the master and the slave devices being connected or in the second state of the master and the slave devices being disconnected, according to the connection condition of the connection ports. Particularly, the state detection may be indicated with high and low levels of a level signal. Upon receipt of a level signal transmitted from the interface connector, the portable terminal is determined to be in the first state if the level signal is high, and to be in the second state if the level signal is low.

For example, the shared device may be connected to each of the first and second interfaces provided on the slave device via a control unit within the slave device, or the first and second interfaces may be provided on the shared device. The master device may be connected to the shared device via the first interface, and the slave device may be connected to the shared device via the second interface.

Step 202: determine the state of the portable terminal based on the detection result, and proceed to step 203 if the state is the first state, and proceed to step 204 if the state is the second state.

Step 203: control the first interface to be in an enabled state and control the second interface to be in a disabled state so that the first device responds to information inputted from the shared device, and end the flow.

When the detection result indicates that the portable terminal is in the first state of the master and the slave devices being connected, the control unit in the slave device may control to enable the first interface and disable the second interface. Now the master device may respond, via the first interface, to the information inputted from the shared device.

Step 204: control the second interface to be in an enabled state so that the second device responds to information inputted from the shared device.

When the detection result indicates that the portable terminal is in the second state of the master and the slave devices being disconnected, that is, when the shared device integrated with the slave device may operate under control of the system of the slave device, the control unit in the slave device may control to enable the second interface, so that the slave device may respond, via the second interface, to the information inputted from the shared device Meanwhile, since the master and slave devices have been physically disconnected, the master device cannot respond to the input information from the shared device no matter whether the first interface is enabled. However, in order to further reduce the power consumption of the first interface, the control unit of the slave device may control the first interface to be in a disabled state while controlling the second interface to be in an enabled state.

Figure 3:
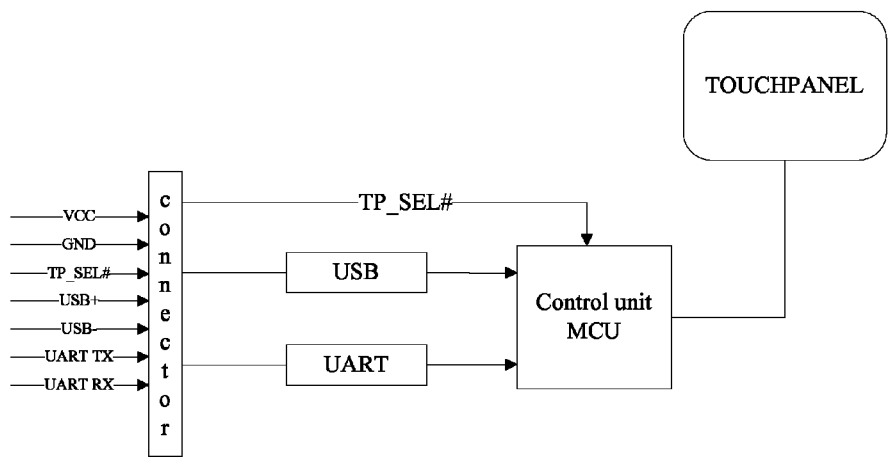
FIG. 3 is a schematic block diagram of a detection control module in a slave device of a portable terminal of the present application.

FIG. 3 is a schematic block diagram of a detection control module in the slave device of the portable terminal, in which the above method is implemented for interface switching control. The touch screen of the portable terminal may be integrated with the slave device, and the control unit EC in the slave device controls the interface enablement.

Suppose that the master device running the X86 system is called PE, and the slave device running the ARM system is called SE. FIG. 3 shows a control unit MCU in the touch-screen detection control module. The MCU is coupled with an interface connector CONNECTOR, and two interfaces USB and UART are each connected to the CONNECTOR and the MCU. The touch-screen detection control module is connected to the slave device SE of the ARM system via the CONNECTOR. The detection information detected by the EC may be transmitted to the MCU via the CONNECTOR. When either of the two interfaces USB and UART is enabled, input information transmitted from TOUCH-PANEL may be provided to the PE or SE for response via connection between the enabled interface and the CONNECTOR.

In particular, the SE and the PE operate in combination as a hybrid system, when the SE is inserted in the PE.

Upon detecting connection of the PC, the EC in the SE may pull up a level signal TP_SEL# to generate a high level signal. The MCU detects via the touch-screen detection control module CONNECTOR that the TP_SEL# is a high level signal. Then, the MCU controls the USB interface to be ENABLE, and the UART interface to be DISABLE. At this time, the external interface of the touch screen TOUCH-PANEL is USB, that is, the PE will respond to the input information from the touch screen via the USB interface. The PE runs the X86 system and has the USB interface as the general interface, and the X86 system has contained the drive for the USB interface. As a result, there is no need for installation of any additional drive.

When the SE is pulled out of the PE, the SE and the PE operate independently.

The EC in the SE detects the pullout from the PE, and pulls down the level signal TP_SEL# to generate a low level signal. The MCU detects via the touch-screen detection control module CONNECTOR that the TP_SEL# is a low level signal. Then, the MCU controls the UART interface to be ENABLE, and the USB interface to be DISABLE. At this time, the external interface of the touch screen TOUCH-PANEL is UART, that is, the SE will respond to the input information from the touch screen via the UART interface. The SE runs the ARM system and has the UART interface as the interface for the ARM system. This can reduce the power consumption compared with the case of using the USB as the interface for the ARM system. Further, there is no need for installation of any additional drive with respect to the UART in the ARM system, and thus the response speed is higher than the USB.

Figure 4A:
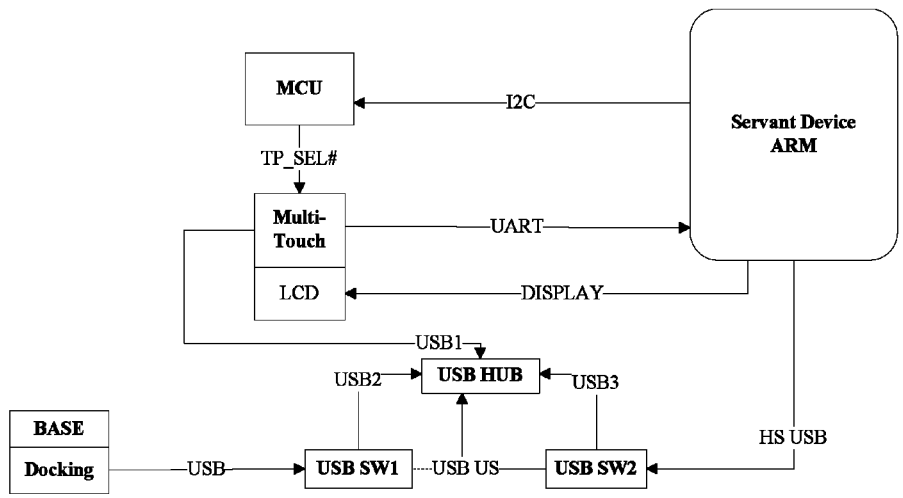
FIG. 4A is a schematic diagram showing an overall architecture of a slave device implementing interface switching control according to an embodiment of the present application.
Figure 4B:
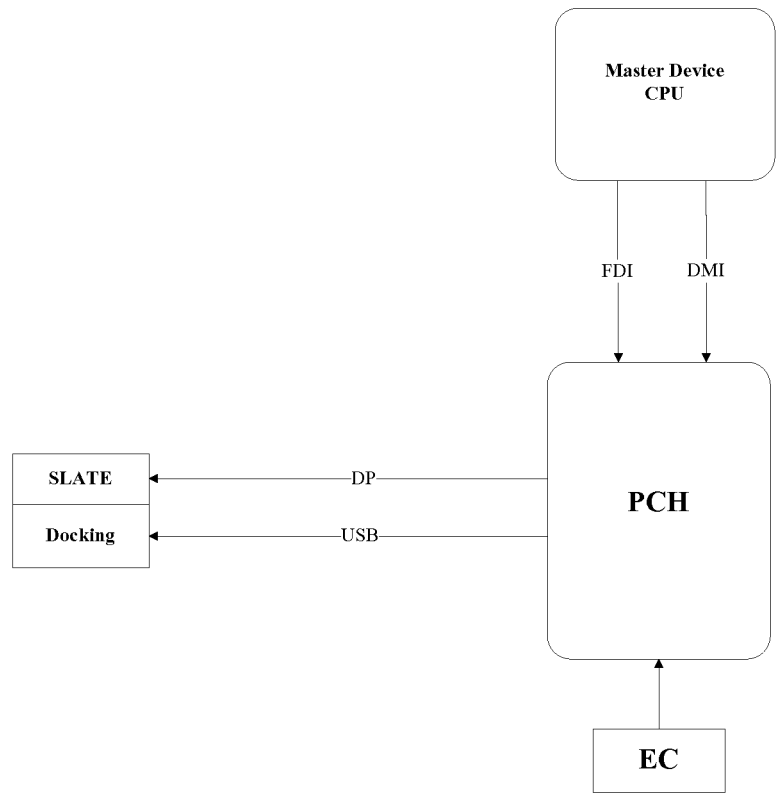
FIG. 4B is a schematic diagram showing an overall architecture of a master device implementing interface switching control according to an embodiment of the present application.

FIG. 4A is a schematic diagram showing an overall architecture of a slave device implementing interface switching control according to an embodiment of the present application, and FIG. 4B is a schematic diagram showing an overall architecture of a master device implementing interface switching control according to an embodiment of the present application.

With reference to FIGS. 4A and 4B, BASEDocking denotes the connection port of the slave device, and SLATEDocking denotes the connection port of the master device. The master and slave devices are physically connected and disconnected via the BASEDocking and SLATEDocking.

In the slave device as shown in FIG. 4A, a multi-touch module Multi-Touch is connected to a display screen LCD, and also connected to the control unit MCU. An interface connector is included in the Multi-Touch. According to the connection state between BASEDocking and SLATEDocking, that is, when BASEDocking and SLATEDocking is connected, the MCU detects that the TP_SEL# is a high level signal via the interface connector included in the Multi-Touch. Then, the MCU controls the USB interface to be enabled and the UART interface to be disabled. Therefore, the master device may respond to input information from the display screen LCD via the USB interface. The UART interface is disabled, and thus the slave device cannot respond to the input information from the display screen LCD via the UART interface. If BASEDocking and SLATEDocking is disconnected, the MCU will detect that the TP_SEL# is a low level signal via the interface connector included in the Multi-Touch. Then, the MCU controls the USB interface to be disabled and the UART interface to be enabled. Therefore, the slave device may respond to input information from the display screen LCD via the UART interface. Since the master and slave devices have been physically disconnected, the master device cannot respond to the input information from the display screen LCD via the USB interface, no matter whether the USB interface is enabled. However, the MCU may control the USB interface to be disabled in order to further reduce system power consumption.

Correspondingly to the embodiments of the interface switching control methods of the present application, embodiments are also provided directed to a portable terminal, a portable mobile device and an input device.

Figure 5:
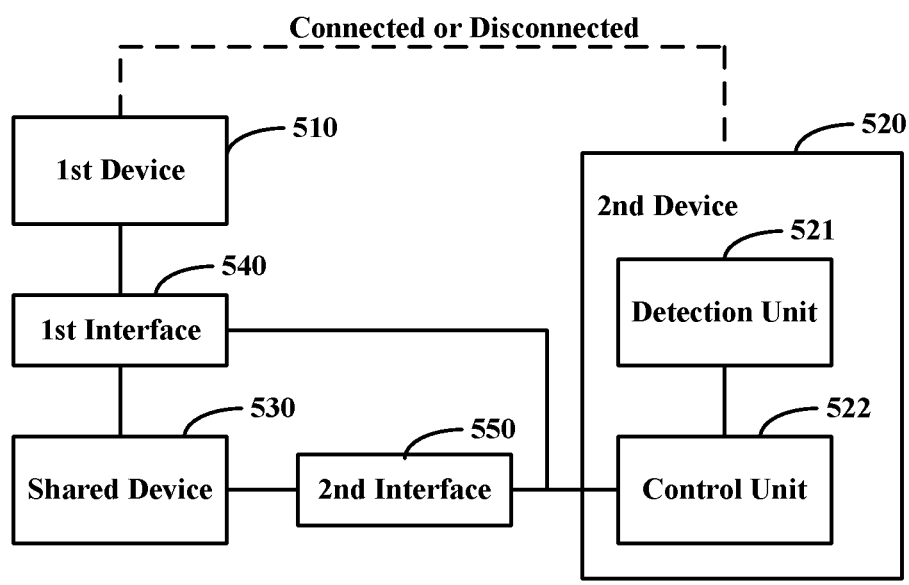
FIG. 5 is a schematic block diagram of an embodiment of a portable terminal according to the present application.

FIG. 5 is a schematic block diagram of an embodiment of a portable terminal according to the present application. The portable terminal may include a first device 510, a second device 520, a shared device 530, a first interface 540, and a second interface 550. The first device 510 is connected to the shared device 530 via the first interface 540, and the second device 520 is connected to the shared device 530 via the second interface 550. The portable terminal has a first state in which the first device 510 and the second device 520 are connected, and a second state in which the first device 510 and the second device 520 are disconnected. In use, the first interface 540 and the second interface 550 may be provided in the second device 530 or in the shared device 530. Further, the shared device 530 may be integrated with the second device. For a clear illustration, FIG. 5 depicts the respective parts separate from each other.

According to an embodiment of the present invention, the second device 520 may comprise: a detection unit 521 configured to detect a state of the portable terminal and generate a detection result; a control unit 522 configured to, when the detection result indicates that the portable terminal is in the first state, control the first interface to be in an enabled state and control the second interface to be in an disabled state so that the first device responds to information inputted from the shared device.

Further, the control unit 522 is further configured to, when the detection result indicates that the portable terminal is in the second state, control the second interface 550 to be in an enabled state so that the second device 520 responds to information inputted from the shared device 530. Preferably, the control unit 522 is further configured to control the first interface 540 to be in a disabled state while controlling the second interface 550 to be in an enabled state.

In particular, the detection unit further comprises (not shown): a level signal reception unit configured to receive a level signal transmitted from an interface connector; a terminal state determination unit configured to determine the portable terminal to be in the first state when the level signal is a high level signal, and determine the portable terminal to be in the second state when the level signal is a low level signal.

Figure 6:
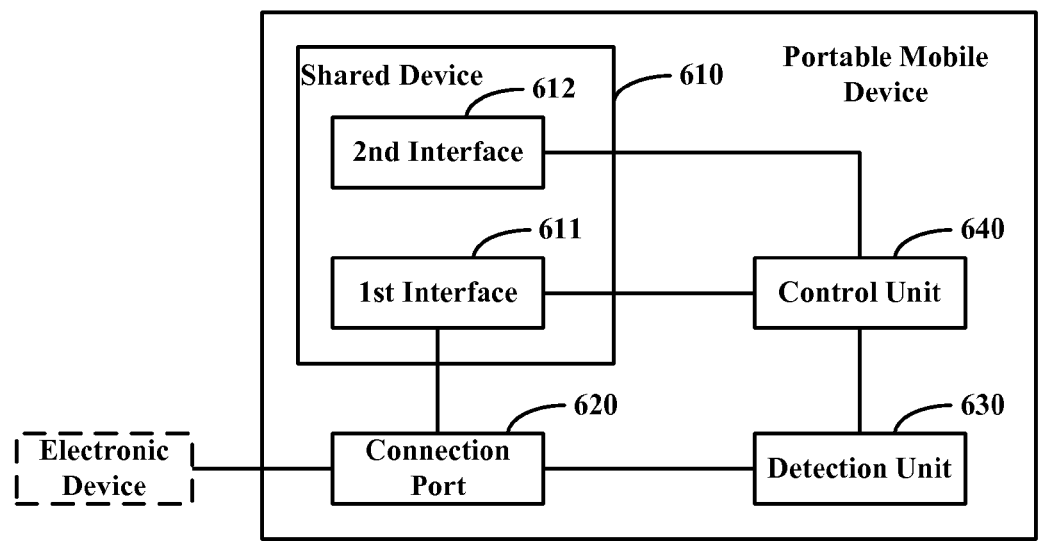
FIG. 6 is a schematic block diagram of an embodiment of a portable mobile device according to the present application.

FIG. 6 is a schematic block diagram of an embodiment of a portable mobile device according to the present application. As shown in FIG. 6, the portable mobile device includes a shared device 610, a connection port 620, a detection unit 630 and a control unit 640. The shared device 610 includes a first interface 611 and a second interface 612 therein. The connection port 620 is configured to connect an electronic device. The first interface 611 is connected to the electronic device via the connection port 620 when the portable mobile device is connected with the electronic device.

For example, the detection unit 630 may be configured to detect a state of the portable mobile device and generate a detection result. The control unit 640 may be configured to, when the detection result indicates that the portable mobile device is connected with the electronic device, control the first interface 611 to be in an enabled state and control the second interface 612 to be in an disabled state so that the electronic device responds to information inputted from the shared device 610.

The control unit 640 may be further configured to, when the detection result indicates that the portable mobile device is disconnected from the electronic device, control the second interface 612 to be in an enabled state so that the portable mobile device responds to information inputted from the shared device 610. Preferably, the control unit 640 may be further configured to control the first interface 611 to be in a disabled state while controlling the second interface 612 to be in an enabled state.

Figure 7:
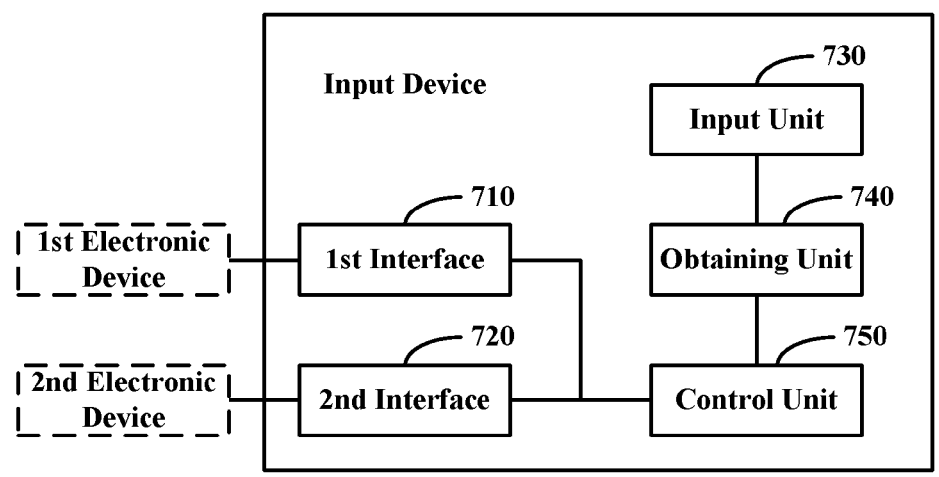
FIG. 7 is a schematic block diagram of an embodiment of an input device according to the present application.

FIG. 7 is a schematic block diagram of an embodiment of an input device according to the present application. As shown in FIG. 7, the input device includes a first interface 710, a second interface 720, an input unit 730, an obtaining unit 740, and a control unit 750. The input device is preferably a touch input device.

For example, the first interface 710 may be configured to connect with a first electronic device. The second interface 720 may be configured to connect with a second electronic device. The input unit may be provided for an operation by an operator. The obtaining unit 740 may be connected to the input unit 730 and configured to obtain input information when the operator operates the input unit. The control unit 750 may be connected to each of the obtaining unit 740, the first interface 710 and the second interface 720, and configured to transmit the input information obtained by the obtaining unit 740 to the first and second interfaces 710, 720, and control according to a predetermined policy one of the first and second interfaces 710, 720 to be in an enabled state and the other one to be in a disabled state.

Particularly, the control unit 750 may include (not shown): a command reception unit configured to receive a key enable command; and an enable control unit configured to, based on instruction of the key enable command, control one of the first and second interfaces to be in an enabled state and the other one to be in a disabled state.

Alternatively, the control unit 750 may include (not shown): a message reception unit configured to receive a connection state message transmitted from any one of the first and second electronic devices when the first and second electronic devices are connected or disconnected; and an enable control unit configured to control the first interface to be in an enabled state and the second interface to be in a disabled state when the connection state message indicates that the first and second electronic devices are connected, and to control the first interface to be in a disabled state and the second interface to be in an enabled state when the connection state message indicates that the first and second electronic devices are disconnected.

Alternatively, the control unit 750 may include (not shown): a connection detection unit configured to detect a connection state between the first and second electronic devices, and to generate a detection result; and an state enable unit configured to control the first interface to be in an enabled state and the second interface to be in a disabled state when the detection result indicates that the first and second electronic devices are connected, and to control the first interface to be in a disabled state and the second interface to be in an enabled state when the detection result indicates that the first and second electronic devices are disconnected.

As described in the above embodiments, the portable terminal of the present application includes a first device and a second device. The first device is connected to a shared device via a first interface, and the second device is connected to the shared device via a second interface. The portable terminal has a first state in which the first device and the second device are connected, and a second state in which the first device and the second device are disconnected. The state of the portable terminal is detected to generate a detection result. When the detection result indicates that the portable terminal is in the first state, the first interface is controlled to be in an enabled state and the second interface is controlled to be in a disabled state, so that the first device responds to information inputted from the shared device. The embodiments of the present application implement a real-time switching control over the interfaces for the shard device. This can optimize the interface control for the hybrid-system portable terminal. Further, the embodiments of the present application can meet system performance requirements of different devices and reduce the system power consumption by enabling the interfaces required by the respective devices according to the different states of the portable terminal.

As apparent to those skilled in the art, the technologies adopted in the embodiments may be implemented by means of software and necessary general hardware platform. Accordingly, the essential parts or parts making contribution to the prior art of the solutions of the present application may be embodied in the form of software product. Such computer software product may be stored in a storage medium, such as ROM/RAM, magnetic disk, optical disk and the like, and include several instructions to cause a computer device (e.g., personal computer, server or network device) to perform the methods according to the respective embodiments or part of the embodiments in the present application.

The respective embodiments in the above description are illustrated progressively, and the same or like parts between the embodiments may refer to each other. The difference of each embodiment from the other embodiments is specifically described. In particular, the description of system embodiments is relatively simply since they are similar to the method embodiments, and the description of relevant parts may be referred to the corresponding parts in the method embodiments.

The foregoing description of the embodiments should not be construed as limiting the present invention. Any modification, substation or improvement within the spirit and principle of the present application falls into the scope of the application.

What is claimed is:

1. An interface switching control method applied in a portable terminal including a first device and a second device, wherein the first device is connected to a shared device via a first interface, and the second device is connected to the shared device via a second interface, the portable terminal has a first state in which the first device and the second device are connected, and a second state in which the first device and the second device are disconnected, the method comprises:
    detecting a state of the portable terminal, and generating a detection result; and
    when the detection result indicates that the portable terminal is in the first state, controlling the first interface to be in an enabled state and controlling the second interface to be in an disabled state so that the first device responds to information inputted from the shared device,
    wherein the first interface conforms to a system requirement or specification of the first device, the second interface conforms to a system requirement or specification of the second device, and the first interface is different from the second interface.

2. The method of claim 1, further comprising:
    when the detection result indicates that the portable terminal is in the second state, controlling the second interface to be in an enabled state so that the second device responds to information inputted from the shared device.

3. The method of claim 2, further comprising:
    controlling the first interface to be in a disabled state while controlling the second interface to be in an enabled state.

4. The method of claim 1, wherein detecting a state of the portable terminal comprises:
    receiving a level signal transmitted from an interface connector; and
    determining the portable terminal to be in the first state when the level signal is a high level signal, and determining the portable terminal to be in the second state when the level signal is a low level signal.

5. A portable terminal comprising a first device, a second device and a shared device, wherein the first device is connected to a shared device via a first interface, and the second device is connected to the shared device via a second interface, the portable terminal has a first state in which the first device and the second device are connected, and a second state in which the first device and the second device are disconnected, the second device further comprises:
    a detection unit configured to detect a state of the portable terminal and generate a detection result; and
    a control unit configured to, when the detection result indicates that the portable terminal is in the first state, control the first interface to be in an enabled state and control the second interface to be in an disabled state so that the first device responds to information inputted from the shared device,
    wherein the first interface conforms to a system requirement or specification of the first device, the second interface conforms to a system requirement or specification of the second device, and the first interface is different from the second interface.

6. The portable terminal of claim 5, wherein the control unit is further configured to, when the detection result indicates that the portable terminal is in the second state, control the second interface to be in an enabled state so that the second device responds to information inputted from the shared device.

7. The portable terminal of claim 6, wherein the control unit is further configured to control the first interface to be in a disabled state while controlling the second interface to be in an enabled state.

8. The portable terminal of claim 5, wherein the detection unit further comprises:
    a level signal reception unit configured to receive a level signal transmitted from an interface connector; and
    a terminal state determination unit configured to determine the portable terminal to be in the first state when the level signal is a high level signal, and determine the portable terminal to be in the second state when the level signal is a low level signal.

9. A portable mobile device comprising a shared device and a connection port, the shared device having a first interface and a second interface, wherein the connection port is configured to connect with an electronic device, and the first interface is connected to the electronic device via the connection port when the portable mobile device is connected with the electronic device, the portable mobile device further comprises:
    a detection unit configured to detect a state of the portable mobile device and generate a detection result; and
    a control unit configured to, when the detection result indicates that the portable mobile device is connected with the electronic device, control the first interface to be in an enabled state and control the second interface to be in an disabled state so that the electronic device responds to information inputted from the shared device,
    wherein the first interface conforms to a system requirement or specification of the electronic device, and the first interface is different from the second interface.

10. The portable mobile device of claim 9, wherein the control unit is further configured to, when the detection result indicates that the portable mobile device is disconnected from the electronic device, control the second interface to be in an enabled state so that the portable mobile device responds to information inputted from the shared device.

11. The portable mobile device of claim 10, wherein the control unit is further configured to control the first interface to be in a disabled state while controlling the second interface to be in an enabled state.

12. An input device comprising:
a first interface configured to connect with a first electronic device;
a second interface configured to connect with a second electronic device;
an input unit provided for an operation by an operator;
an obtaining unit connected to the input unit and configured to obtain input information when the operator operates the input unit; and
a control unit connected to each of the obtaining unit, the first interface and the second interface, and configured to transmit the input information obtained by the obtaining unit to the first and second interfaces, and control according to a predetermined policy one of the first and second interfaces to be in an enabled state and the other one to be in a disabled state,
wherein the first interface conforms to a system requirement or specification of the first electronic device, the second interface conforms to a system requirement or specification of the second electronic device, and the first interface is different from the second interface.

13. The input device of claim 12, wherein the control unit comprises:
a command reception unit configured to receive an key enable command; and
an enable control unit configured to, based on instruction of the key enable command, control one of the first and second interfaces to be in an enabled state and the other one to be in a disabled state.

14. The input device of claim 12, wherein the control unit comprises:
a message reception unit configured to receive a connection state message transmitted from any one of the first and second electronic devices when the first and second electronic devices are connected or disconnected; and
an enable control unit configured to control the first interface to be in an enabled state and the second interface to be in a disabled state when the connection state message indicates that the first and second electronic devices are connected, and to control the first interface to be in a disabled state and the second interface to be in an enabled state when the connection state message indicates that the first and second electronic devices are disconnected.

15. The input device of claim 12, wherein the control unit comprises:
a connection detection unit configured to detect a connection state between the first and second electronic devices, and to generate a detection result; and
an state enable unit configured to control the first interface to be in an enabled state and the second interface to be in a disabled state when the detection result indicates that the first and second electronic devices are connected, and to control the first interface to be in a disabled state and the second interface to be in an enabled state when the detection result indicates that the first and second electronic devices are disconnected.

* * * * *